(No Model.) 2 Sheets—Sheet 1.
A. J. STEVENS.
Friction Brake for Steering Apparatus for Vessels.
No. 239,877. Patented April 5, 1881.
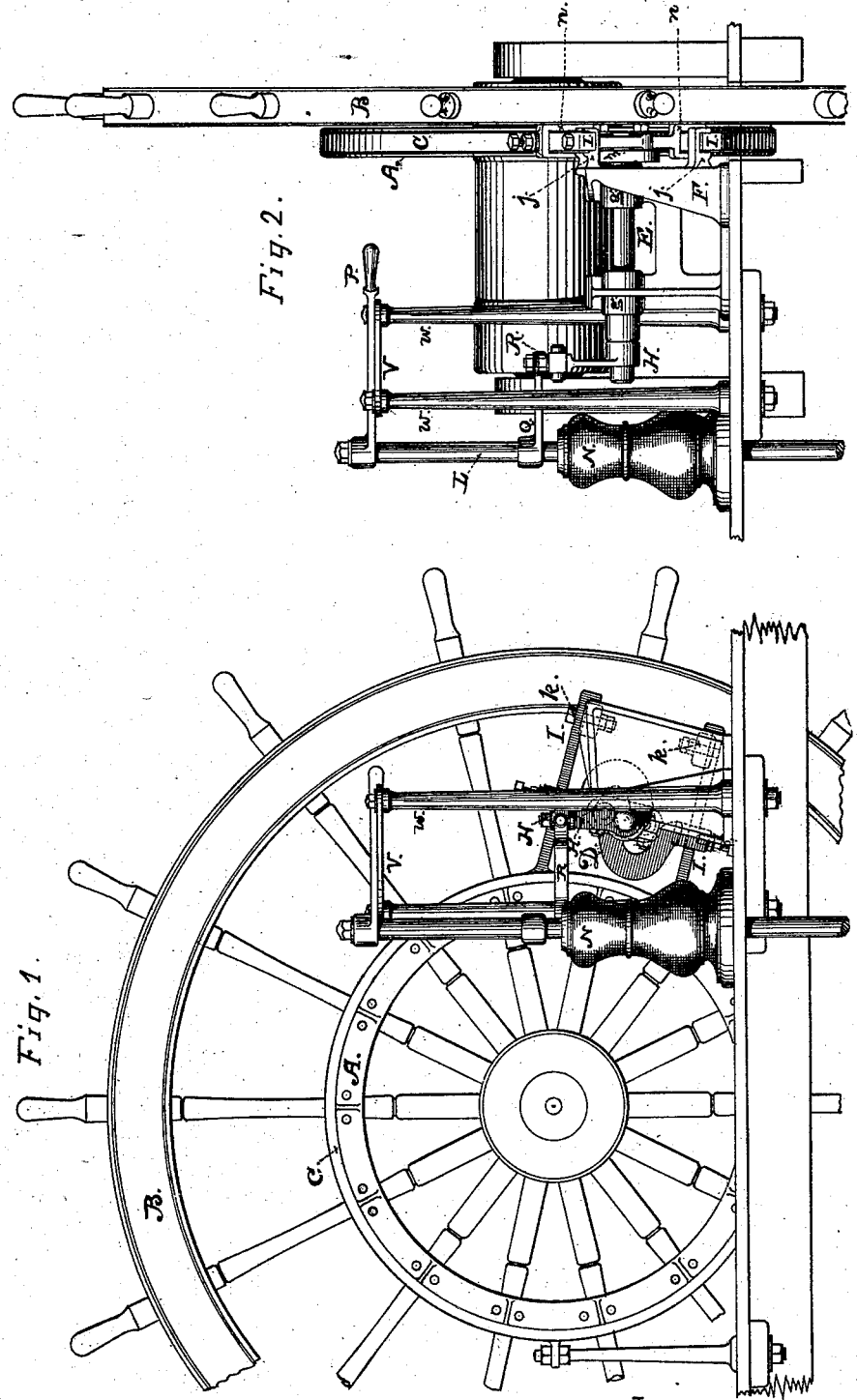
Witnesses:
Inventor:
Andrew J. Stevens,
By his Attys, Dome & Osborn.

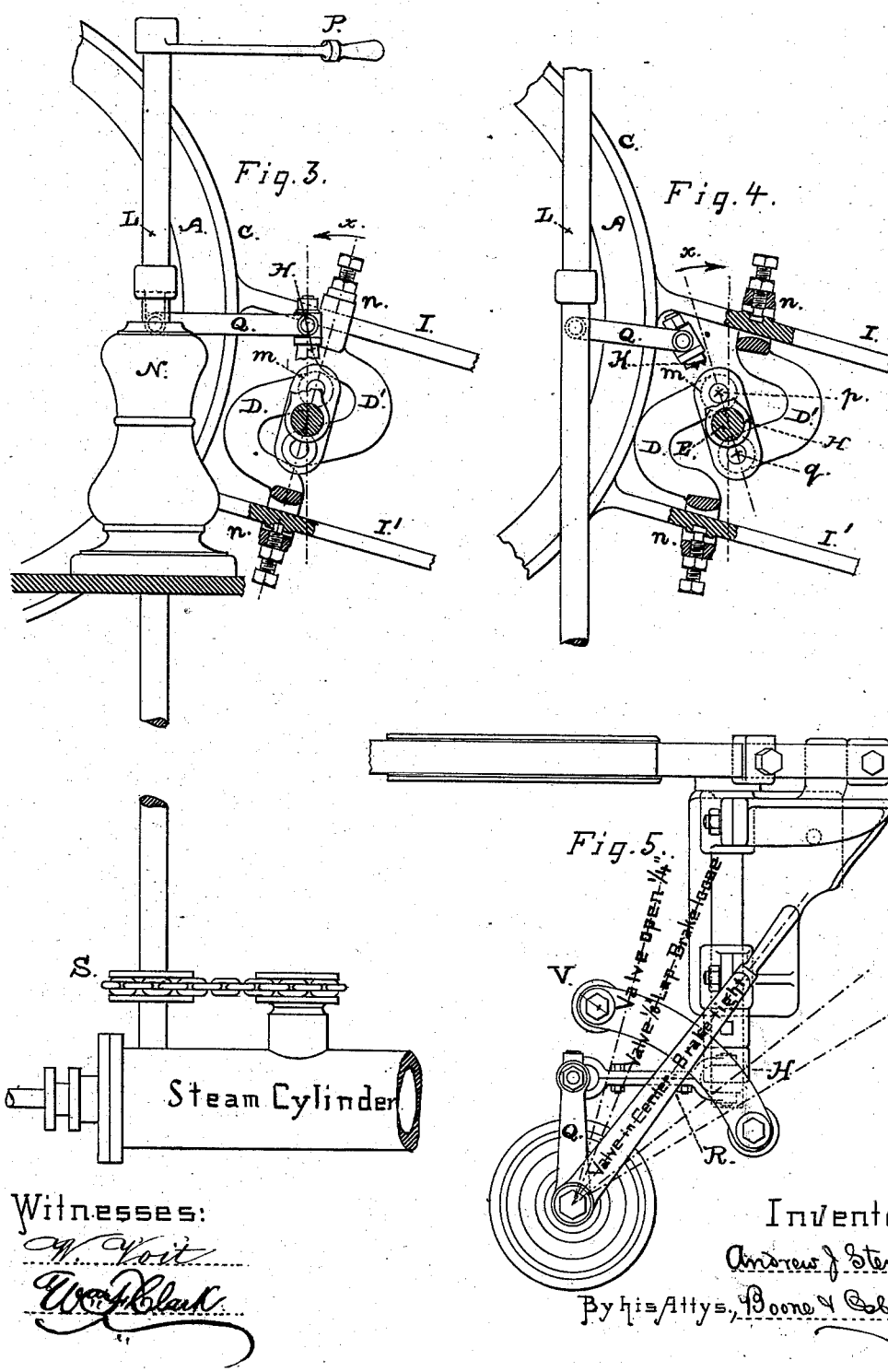

United States Patent Office.

ANDREW J. STEVENS, OF SACRAMENTO, CALIFORNIA.

FRICTION-BRAKE FOR STEERING APPARATUS FOR VESSELS.

SPECIFICATION forming part of Letters Patent No. 239,877, dated April 5, 1881.

Application filed December 20, 1880. (No model.)

*To all whom it may concern:*

Be it known that I, ANDREW J. STEVENS, of the city and county of Sacramento, in the State of California, have made and invented a new and useful Improvement in Friction-Brakes for Steering Apparatus of Vessels; and I do hereby declare that the following is a full, clear, and exact description of the construction and operation of my said invention, reference being had to the accompanying drawings.

The present invention has relation to certain new and useful improvements in that class of brakes for holding the wheel or drum in steering apparatus for vessels in which the axle or chain-drum of the steering-gear has applied thereto a band-wheel or sheave provided with a friction band or strap passing around it, the two ends thereof being connected to a tightening mechanism.

The invention has for its object to render this tightening mechanism more effectual and practical in its operation; also, combining and arranging the brake and its operating mechanism with the valves or other controlling mechanism of power-steering apparatus for vessels, in such manner that the brake is operated automatically by the same lever or device which stops and starts the power, and the one is thrown off as the other is brought into action, or vice versa. These objects I attain by the mechanism illustrated in the drawings, and hereinafter described.

Referring to the accompanying drawings for a better understanding of my invention, Figure 1 is a front elevation of a steering-wheel with my improvements applied thereto. Fig. 2 is a side elevation taken from the right-hand side of Fig. 1. Figs. 3 and 4 are enlarged detail views of the mechanism for operating the brake and also the valves of a power steering apparatus when such is used in a vessel. Fig. 5 is a plan view of Figs. 1 and 2.

The brake and its tightening mechanism consist of the band-wheel or sheave A, fixed to the drum or axle B, the brake band or strap C, and the toggles D D', by which the ends of the band are tightened and friction of the band against the sheave produced and maintained at will. The toggles D are connected to and operated by a horizontal rock-shaft, E.

In applying this brake to hand steering apparatus, or where a hand-wheel is employed, I generally secure the brake-wheel or sheave A directly to the steering-wheel by means of straps or suitable fastenings around the spokes; but in cases where it is applied to the chain-drum or other equivalent part of a power steering apparatus, this sheave is fixed to or formed on the end of the drum.

In front of the drum B, and secured to the floor below it, is a stand, F, having boxes $g$ $g$ to receive and support the horizontal rock-shaft E. To one side of this stand are secured, also, the ends of two rods or bars, I I', which are extensions of the friction-strap C. These bars or arms I have the ends of the strap fastened or united to them; and while the strap lies around its sheave these two arms extend forward, one over and at a short distance above the other, to the stand F, where they are fastened at the ends to the ears or projections $j$ of the stand by means of the through-bolts $k$, as plainly seen in Figs. 1, 2, and 5 of the drawings. Upon these two arms I I', between the stand F and the strap C, I apply a griping device or mechanism to draw the arms together and tighten the strap around the sheave. The means combined with these arms is clearly shown in Fig. 4, and consists of the horizontal rock-shaft E, with a cross-arm, $m$, at one end, to which the inner ends of two curved links, D D', are attached. These parts form a toggle, that is operated by turning the shaft E. The outer end of each link has a slot or stirrup, $n$, through which one of the arms I passes. The lower link, D, is pivoted at $p$ to the upper end of the cross-arm $m$, and the upper link, D', extends down and is attached in the same manner to the lower end of the arm $m$ at $q$. The arm I is acted upon by the upper link, while the lower link works upon the arm I'. Any movement of the rock-shaft E that throws the cross-arm $m$ from the inclined to an upright position in the direction indicated by the arrows $x$ $x$ in Figs. 4 and 5 will draw the outer ends of the two links D D' toward the center with great force and tighten the strap C around its sheave. By a simple movement of the rock-shaft, therefore, in one direction or the other, the arms I I' are drawn toward each other and the brake put on, or they are released and the brake thrown off. This constitutes a simple, powerful, and efficient brake for use on steering apparatus. It acts quickly to hold or release the rudder, and a small amount of power is required on the part of the operator to throw it into or out of action.

On the end of the rock-shaft E is the arm or lever H for turning it. This arm is connected with an upright shaft, L, supported by a guide, N, that is fixed to the floor in proximity to the stand F. A lever-handle, P, is fixed on the upper end of this shaft L, and a horizontally-projecting arm, Q, is also secured on this shaft, to the end of which connection is made from the upright arm H of the rock-shaft E. These two parts H Q are joined together by means of a universal-joint connection, R, that is required by reason of the arms H Q working in planes at an angle to each other, as will be clearly understood from Figs. 2 and 5 of the drawings.

The upright shaft L passes down through the floor or deck whereon the brake is stationed, and to its lower end is attached or connected the means by which the valves or other power-controlling mechanism of the steam or other motor of the steering apparatus are operated. This connection is made either by means of an arm fixed on the lower end of the shaft L, so as to act upon the valves as the shaft is turned by its lever-handle, or by other means, such as a pulley, S, on the shaft, to operate a belt for turning a valve-spindle, or by means of a counter-shaft geared into this upright shaft, so as to be moved by it and the movement transmitted to the valve mechanism. Both the steering-gear and the brake for holding the rudder at any point are thus operated simultaneously by the one handle, and the power is applied and the brake removed when the lever-handle takes a position to one side or the other of the center, or by being brought back to this center position the valves are shut off and the brake put on.

The lever P turns over a segment-plate, V, supported by the stands $w$, and the several positions to be taken by the lever P are indicated by suitable marks or stops upon this segment, to facilitate the setting of the valves and the brake.

The connection together of the two shafts E L is such that a certain amount of motion of the shaft L can take place either way from the center position without operating the valves to apply the power.

Having thus fully described my invention, what I claim, and desire to secure by Letters Patent, is—

1. In combination with the sheave A and its band or strap C, the tightening mechanism consisting of the horizontal rock-shaft E, its cross-arm $m$, the links D D', and the arms or extensions I of the band C, which pass through slots or stirrups $n$ on the ends of the said links, and a rocking lever, H, for turning said shaft E and operating the said toggle D D' $m$, substantially as hereinbefore described, for the objects specified.

2. The combination, with the friction-brake consisting of the horizontal rock-shaft E, with its toggle D D' $m$, the arms or extensions I I, the friction-band C, and its sheave A, of the upright rock-shaft L, connected with the horizontal shaft E, so as to give motion thereto and turn simultaneously therewith, and provided at one end with an operating-handle, P, and at the other end with a valve-operating device or mechanism by which to control and operate the motor of a power steering apparatus, substantially as hereinbefore described, for the objects specified.

In witness that I claim the foregoing I have hereunto set my hand and seal.

ANDREW J. STEVENS. [L. S.]

Witnesses:
JOHN T. WRIGHT,
E. V. JOICE.